United States Patent [19]

Roldness et al.

[11] 4,248,557
[45] Feb. 3, 1981

[54] RAILWAY CAR COUNTER BALANCED TILTING DECK

[75] Inventors: David J. Roldness, San Diego; Thomas H. Watson, Bonita; Gary D. Wonacott, San Diego, all of Calif.

[73] Assignee: Pullman Incorporated, Chicago, Ill.

[21] Appl. No.: 16,643

[22] Filed: Mar. 1, 1979

[51] Int. Cl.³ .................... B60P 3/08; B61D 3/04; B61D 3/16; F16F 1/34
[52] U.S. Cl. ..................................... 410/27; 14/16.1; 105/370; 105/375; 267/162; 404/1
[58] Field of Search .............. 14/16.1, 71.1, 71.3; 105/434, 370, 375; 404/1, 1 R; 410/13, 14, 15, 26, 27, 28, 29; 267/162

[56] References Cited

U.S. PATENT DOCUMENTS

| 1,631,306 | 6/1927 | Constantine | 105/434 |
| 2,708,110 | 5/1955 | Clay | 267/162 |
| 3,292,917 | 12/1966 | Sheburne | 267/162 |
| 3,873,079 | 3/1975 | Kuus | 267/162 |
| 3,982,247 | 9/1976 | Simoneit | 267/162 X |
| 4,043,546 | 8/1977 | Ashfield et al. | 267/162 |
| 4,119,042 | 10/1978 | Naves et al. | 410/27 |

Primary Examiner—Howard Beltran
Attorney, Agent, or Firm—Stephen D. Geimer

[57] ABSTRACT

An operating mechanism for a hinged deck portion of a vehicle-carrying auto-rack railway car utilizing a first-class lever to counterbalance the deck end portion. A spring load is provided by a Belleville spring pack of novel, compact construction which has a substantially constant spring-force versus deflection curve such that manual manipulation of the hinged deck by operating personnel is facilitated during loading and unloading of the auto-rack car.

6 Claims, 8 Drawing Figures

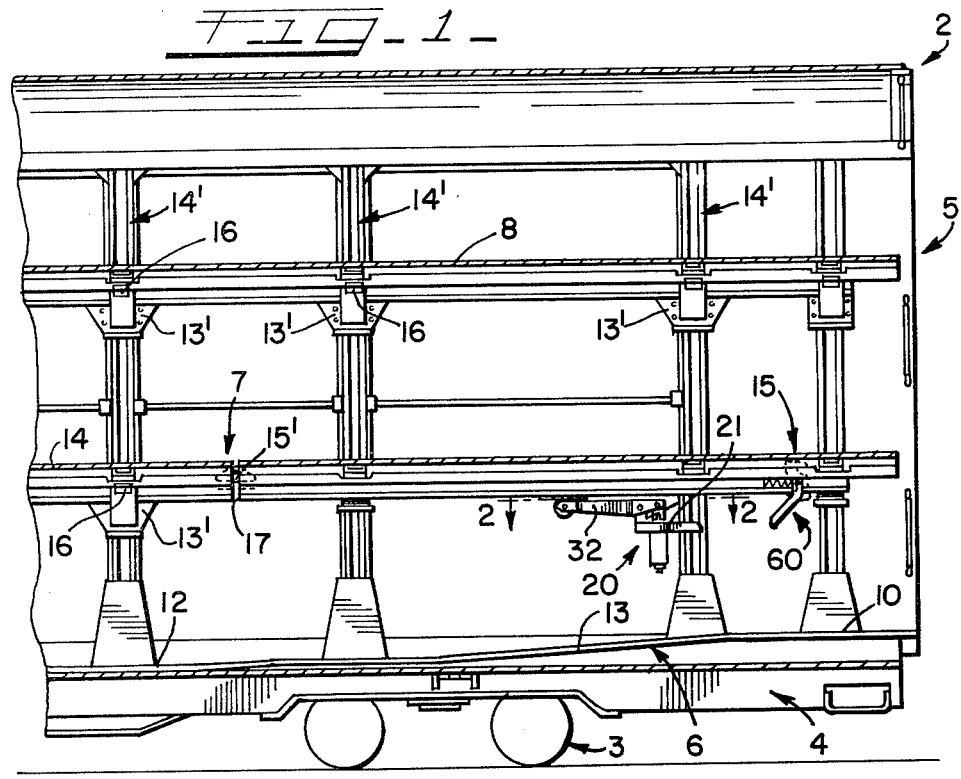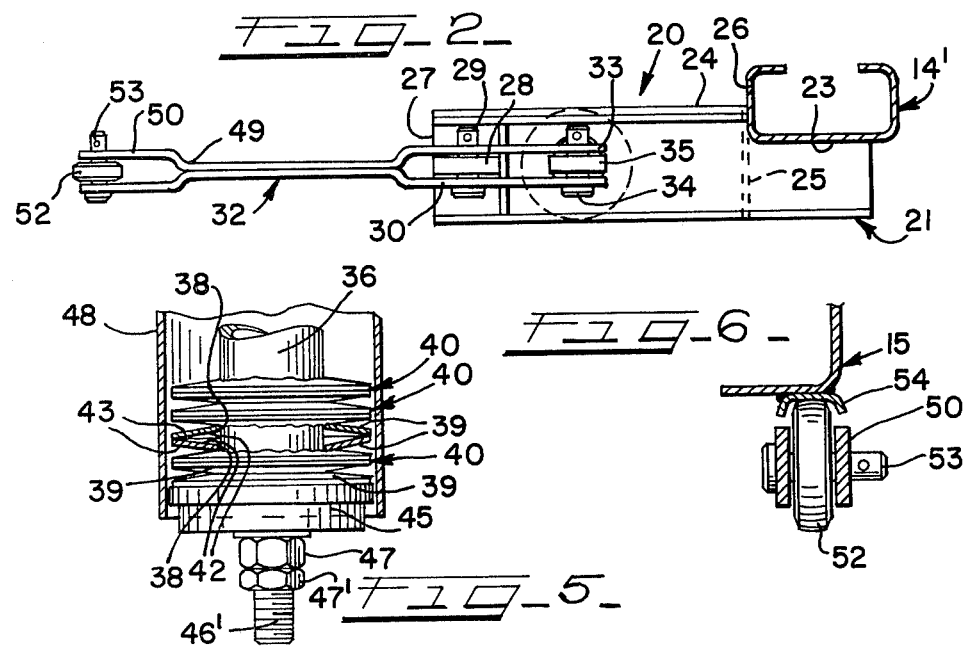

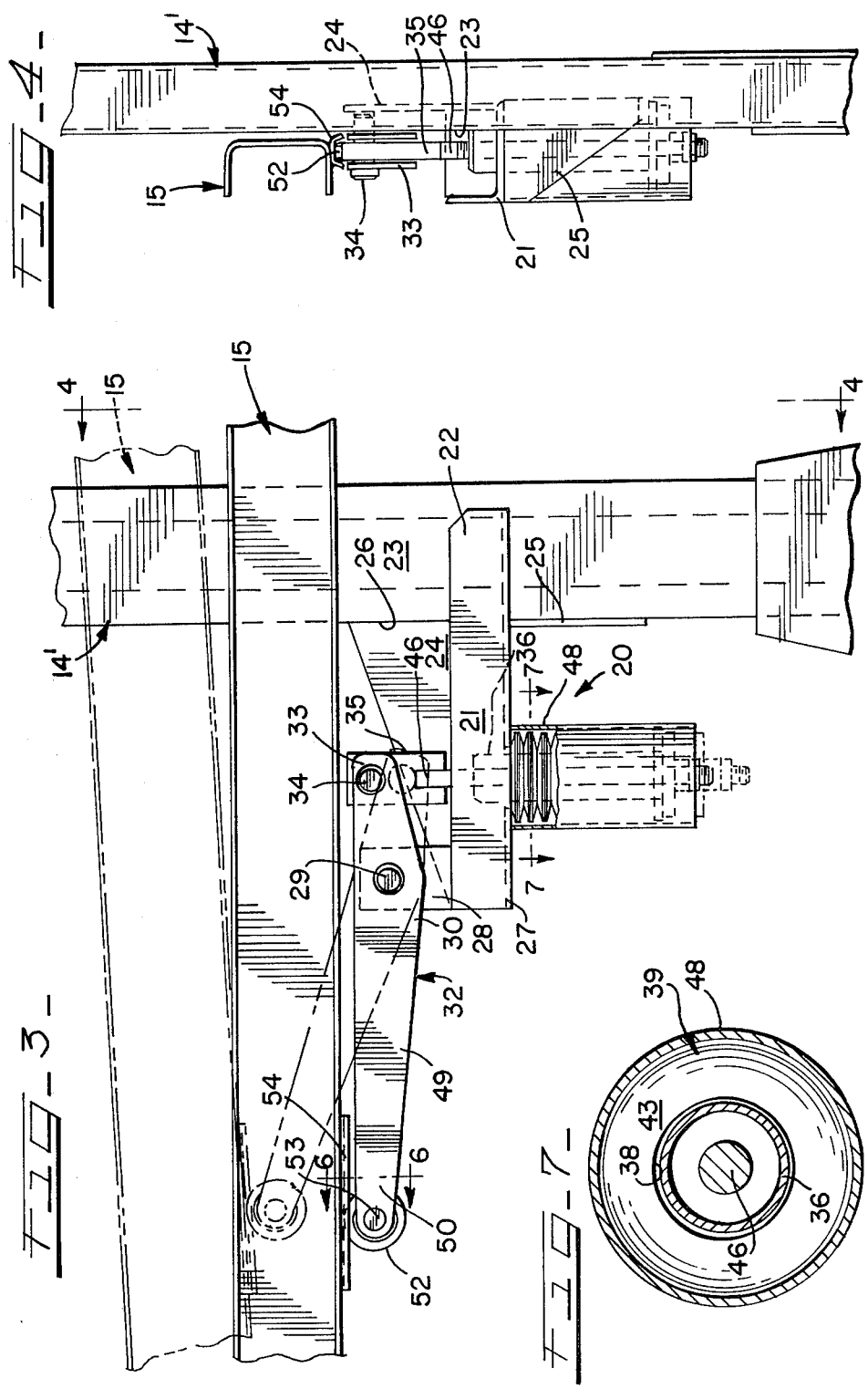

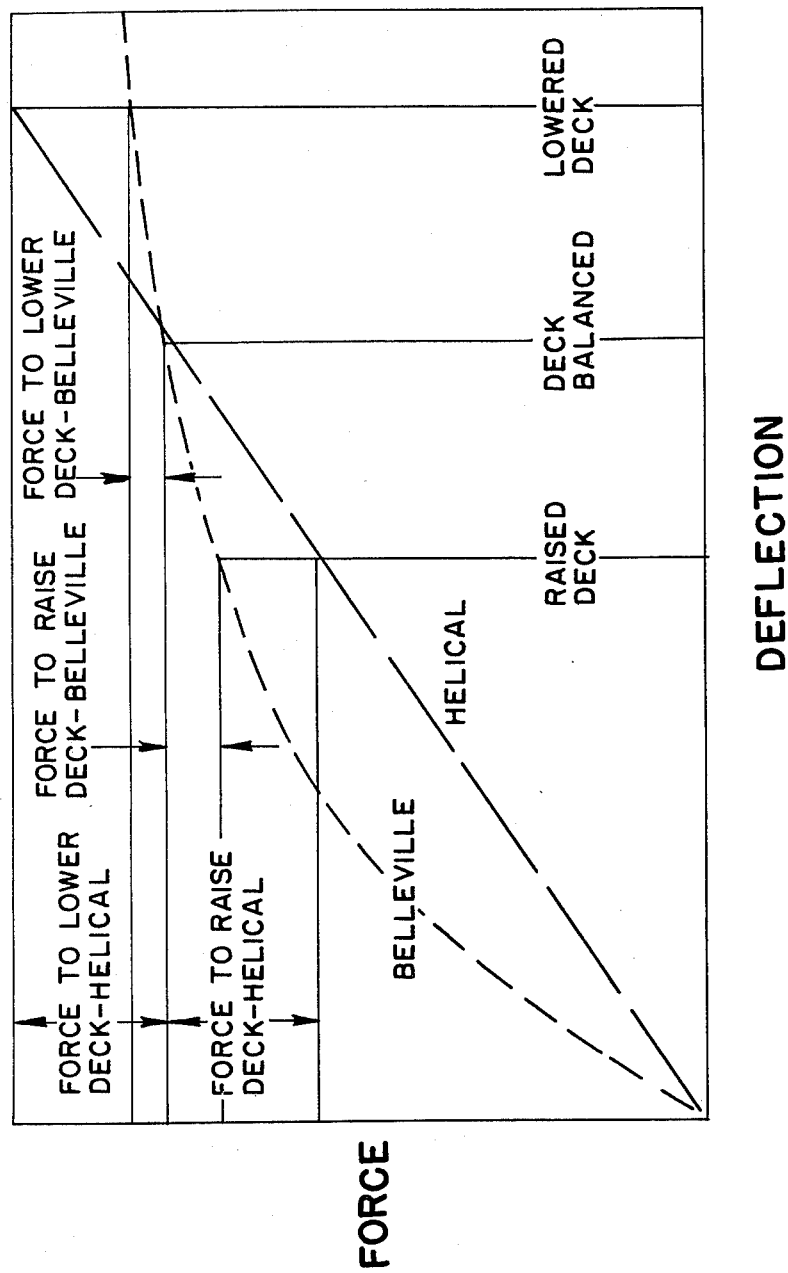

RAILWAY CAR COUNTER BALANCED TILTING DECK

BACKGROUND OF THE INVENTION

1. Field of the Invention

This invention relates to railway cars for the transportation of motor vehicles, and more particularly to an arrangement for operating shiftable deck portions of the car which are movable to facilitate loading and unloading of vehicles.

2. Description of the Prior Art

Heretofore the counterbalancing mechanisms used for lifting and lowering the end deck portion of a rack car for automobiles employed a typical helical spring for operating a lever assembly which translated the force of the spring against the bottom of the hinged deck portion.

Due to the linear spring characteristics of such helical springs, difficulties have been experienced by the workmen in operating the deck, i.e., movement from an intermediate position of the deck to its uppermost position requires additional effort because of the linear decrease in the springs counterbalancing assistance. Similarly, movement from an intermediate position to the lowermost position of the deck requires manual effort to overcome the linearly increasing spring resistance.

SUMMARY OF THE INVENTION

This invention is directed to a novel operating mechanism for the deck of an auto-rack railway car, and more specifically to a novel Belleville spring assembly incorporated in an operating linkage associated with a shiftable deck for raising and lowering it.

The invention comprehends a novel Belleville spring assembly comprising cup-shaped spring members arranged in pairs with their concave sides opposing and peripherally engaging each other. Each spring member has a central aperture by which the members are sleeved onto a hollow guide shaft which has a slight clearance with respect to the edge of the apertures in the spring members. The outer edges of the spring members have a slight clearance with respect to a cylindrical inner surface of a housing within which the springs are encased and guided thereby. The spring assembly is interconnected with one end of a car-mounted lever arrangement, the other end of the lever engaging the lower portion of the shiftable deck, thereby translating the spring force to it.

BRIEF DESCRIPTION OF THE DRAWINGS

The preferred embodiment of the invention will now be described in conjunction with the attached drawings, wherein:

FIG. 1 is a longitudinal sectional view of an auto-rack illustrating the invention;

FIG. 2 is an enlarged sectional view of the lift linkage taken substantially on line 2—2 of FIG. 1;

FIG. 3 is a fragmentary enlarged side elevational view of the operating linkage shown in association with the car body support structure;

FIG. 4 is a cross-sectional view taken substantially on line 4—4 of FIG. 3;

FIG. 5 is a fragmentary vertical sectional view of the spring assembly of the operating linkage;

FIG. 6 is a cross-sectional view taken substantially on line 6—6 on FIG. 3;

FIG. 7 is a cross-sectional view taken substantially on line 7—7 of FIG. 3, and

FIG. 8 is a force deflection graph of helical and Belleville spring assemblies.

DESCRIPTION OF THE PREFERRED EMBODIMENT

The invention is disclosed in association with an auto-rack railway car generally designated 2 which comprises conventional truck assemblies 3 supporting a bed or underframe 4 on which is mounted a multi-tiered rack 5 including a lower deck 6, and intermediate deck 7 and an upper or top deck 8.

As best seen in FIG. 1, the lowermost deck 6 has an end floor section 10 which is elevated above the center section 12 and is connected thereto by a sloping section 13.

The top deck 8, as well as the stationary sections 14 of the intermediate deck, are supported by suitable cross-bearers 16 spaced lengthwise thereof. The bearers 16 are connected at their ends by brackets 13' to upright supports 14' forming the sides of the car, the uprights, 14' being suitably connected at their lower ends to the car underframe as well understood.

The intermediate or second level deck 7 is provided at its ends with vertically displaceable end deck sections 15 which have hinge or pivot connections 15' at their inner ends 17 to the adjacent ends of the stationary center sections 14 of the intermediate deck for lifting and lowering about horizontal axes extending transversely of the car. The reason for having these end sections 15 pivotal is to accommodate movement of automobiles on the end portions 10 of the lower deck 6. When entering the lower deck, the vehicles are inclined and their roof portions would normally not clear the intermediate deck end portion and it is therefore mandatory to provide for such clearance.

The operating mechanism 20 for lifting and lowering the deck sections 15 is best shown in FIG. 3 and comprises a support arm 21 which is connected at one end 22 to a side 23 of adjacent upright support 14'. A gusset plate 24 secures arm 21 to upright 14'. A bracket 25, mounted on side 26 of the associated upright 14' further secures support arm 21. The distal end 27 of the arm 21 is provided with an upright fulcrum 28 which supports a horizontally disposed pin 29. Pin 29 extends through a furcated, intermediate portion 30 of a first class lever 32 having a short force input leg 33 pivotally connected by pin 34 to the upper end of a spring bar 35.

The spring bar 35 is affixed to spring rod 46, which is positioned within the interior of a guide tube 36. The tube 36 extends through the center openings 38 in the Belleville spring elements 39,39, which are arranged in pairs designated 40,40 as best shown in FIG. 5.

Each pair of spring members 40 includes the two springs 39,39 each of which is a concave-convex washer with the concave sides 42,42 facing each other. The convex sides 43,43 face outwardly and adjacent pairs abut each other. The uppermost element 39 is half a pair and has its side 43 facing the underside of arm 21 and peripherally abutting the same. Similarily, the lowermost element 39 is also half a pair and has its concave side 42 facing an annular base member 45 and peripherally seated thereon.

The base member 45 is centrally apertured to pass a threaded end portion 46' of the spring rod 46 therethrough, the portion 46' having an adjusting nut 47 and lock nut 47' threaded thereon beneath the base member 45. When deck section 15 is in the lowered position, base member 45 is positioned with cylindrical housing 48, which is connected at its upper end as by welding to the underside of the arm 21. The underside or the arm serves as a reaction surface attendant to compression of the Belleville spring assembly as shown in FIG. 3.

The lever 32 has force output leg 49 with free end 50 which is provided with a roller 52 rotatable about a horizontal axis on pin 53. The roller is guided in a track 54 secured to the underside of the associated liftable deck end section 15.

As will become readily apparent from FIG. 1 the lever arrangement is different from prior art practices in that the lifting end of the lever is between the lever fulcrum and the axis of the deck pivot 15', reducing the spring stroke and related change in spring force. Furthermore, as illustrated in FIG. 8, the Belleville spring assembly requires a reduced manual force to operate the deck as compared to the conventional helical springs in current use. It will be understood that the Belleville springs and the helical springs provide the same equilibrium force. The difference occurs when the deck is moved to either raised or lowered positions. Because of its linear spring characteristics, the counter-balancing force of the helical spring decreases sharply as the shiftable deck 15 is moved above the equilibrium, thereby requiring substantial physical effort by an operator to move the deck into the raised position. Similarily, an operator must exert substantial effort to move the deck 15 below the equilibrium point as the helical spring load builds up linearly. FIG. 8 illustrates this graphically. In contrast, the Belleville springs exhibit substantially constant or non-linear rate characteristics, as shown in FIG. 8 which facilitates operation of the shiftable deck because of the reduced manual effort required to position the deck in either its raised or lowered position. Additionally, the Belleville springs provide a springloading mechanism of reduced size and weight in comparison to typical helical springs.

A typical latch assembly 60 is provided on the deck section 15 and side frame structure of the rack 5 for locking the pivotal deck sections 15 in position.

Having described a preferred embodiment of the invention, it will become apparent that various modifications can be made which will be encompassed by the appended claims.

What is claimed is:

1. In a railway car for carrying vehicles having a frame mounted thereon for supporting a vehicle-carrying deck wherein a movable section of said deck is mounted for pivotal movement about a generally horizontal axis between an upper raised position and a lower vehicle-carrying position, an improved counterbalancing assembly for said movable deck comprising:
    lever means pivotally supported on said frame, said lever means having first and second ends and being pivotally supported intermediate of said ends,
    said first end of said lever means being in engagement with said movable deck section intermediate of the pivot axis of said movable section and the pivot axis of said lever means,
    compressive spring means reactively connected with the second end of said lever means whereby said first end of said lever means is urged upwardly against said movable deck section thereby exerting a counterbalancing force against the weight of said movable deck section, and
    said spring means being spring elements exhibiting substantially constant force/deflection spring characteristics to facilitate movement of said movable deck section above and below a counterbalanced equilibrium point.

2. The invention in accordance with claim 1, wherein said frame includes bracket means for pivotally supporting said lever means.

3. The invention in accordance with claim 2, wherein said compressive spring means comprise
    a spring bar having one end pivotally attached to said second end of said lever means and extending downwardly therefrom, and
    said spring elements being compressive springs held captive between said bracket means and another end of said spring bar thereby maintaining said spring bar in tension.

4. The invention in accordance with claim 3, wherein said spring elements comprise a plurality of Belleville spring elements carried by said spring bar in concentric relationship thereto.

5. The invention in accordance with claim 4, wherein said lever means includes roller means pivotally mounted at the first end thereof for providing rolling engagement of said lever means with said movable deck portion.

6. The invention in accordance with claim 2, wherein said bracket means includes tubular guide means for housing said compressive spring means.

* * * * *